United States Patent
Rameil-Green

(10) Patent No.: US 10,212,214 B2
(45) Date of Patent: Feb. 19, 2019

(54) NETWORK GATEWAY IMPLEMENTING AN INSTANCE MANAGER FUNCTION

(71) Applicant: Vodafone GmbH, Düsseldorf (DE)

(72) Inventor: Marc Andre Rameil-Green, Düsseldorf (DE)

(73) Assignee: Vodafone GmbH, Düsseldorf (DE)

( * ) Notice: Subject to any disclaimer, the term of this patent is extended or adjusted under 35 U.S.C. 154(b) by 379 days.

(21) Appl. No.: 14/546,120

(22) Filed: Nov. 18, 2014

(65) Prior Publication Data
US 2015/0142879 A1    May 21, 2015

(30) Foreign Application Priority Data
Nov. 18, 2013  (EP) .................................... 13193302

(51) Int. Cl.
H04L 29/08   (2006.01)
H04L 12/24   (2006.01)
H04L 29/06   (2006.01)

(52) U.S. Cl.
CPC .............. H04L 67/10 (2013.01); H04L 41/28 (2013.01); H04L 65/1016 (2013.01); H04L 65/1036 (2013.01); H04L 65/1073 (2013.01); H04L 67/42 (2013.01)

(58) Field of Classification Search
None
See application file for complete search history.

(56) References Cited

U.S. PATENT DOCUMENTS

| | | | |
|---|---|---|---|
| 2002/0010683 A1* | 1/2002 | Aune | G06Q 20/3674 705/67 |
| 2009/0190573 A1 | 7/2009 | Siegel et al. | |
| 2010/0195606 A1* | 8/2010 | Kim | H04L 65/1016 370/329 |
| 2010/0223339 A1* | 9/2010 | Cheng | H04L 29/12216 709/206 |
| 2010/0246444 A1 | 9/2010 | Witzel et al. | |
| 2012/0094666 A1* | 4/2012 | Awoniyi | H04W 48/16 455/435.1 |
| 2012/0128006 A1* | 5/2012 | Petersson | H04L 12/2834 370/401 |
| 2014/0259127 A1* | 9/2014 | Shaw | H04L 63/0884 726/5 |

(Continued)

FOREIGN PATENT DOCUMENTS

GB    2419774    5/2006

OTHER PUBLICATIONS

3rd Generation Partnership Project; Technical Specification Group Services and System Aspect; Study on Web Real Time Communication (WebRTC) access to IMS (Stage 2) (Release 12), downloaded by EPO Nov. 4, 2013 (all pages—55 total).

Primary Examiner — Joshua Joo
(74) Attorney, Agent, or Firm — Occhiuti & Rohlicek LLP

(57) ABSTRACT

A communication network comprises an access network, a subsystem and a gateway computer that bridges the access network and the subsystem. A plurality of client applications of a single user may connect to services provided by the subsystem. The gateway registers the user in the subsystem and associates all communication of the plurality of instances with a unique identifier that identifies the combination of the user and the gateway thus reducing the number of user registrations in the subsystem.

16 Claims, 3 Drawing Sheets

(56) References Cited

U.S. PATENT DOCUMENTS

Figure 1:
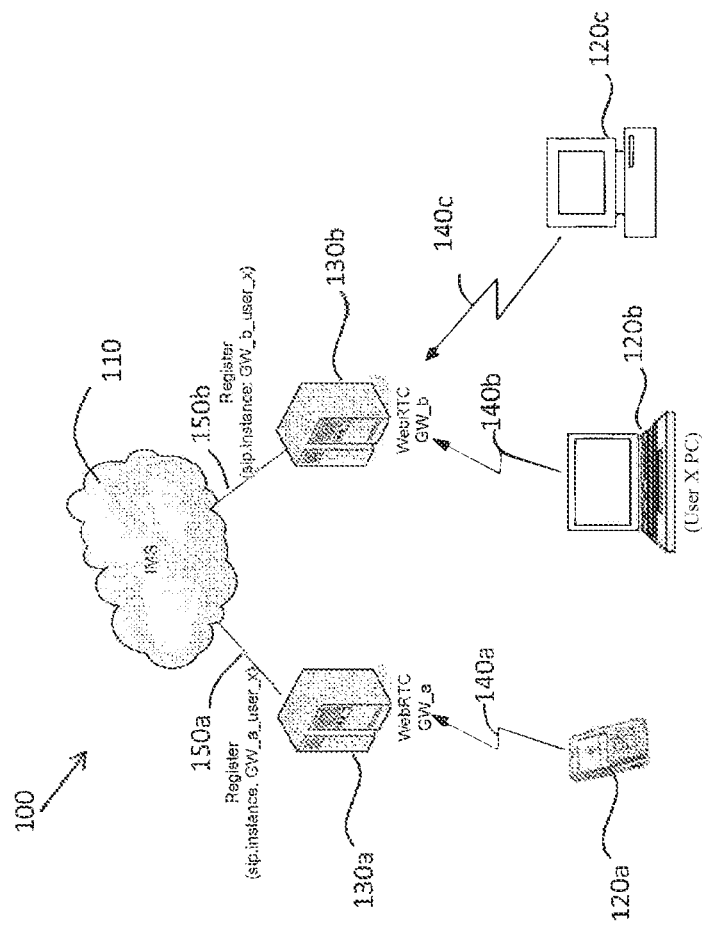

2014/0379931 A1* 12/2014 Gaviria ............... H04L 65/1016
709/227
2015/0341396 A1* 11/2015 Rautiola ........... H04L 29/12311
370/328

* cited by examiner

NETWORK GATEWAY IMPLEMENTING AN INSTANCE MANAGER FUNCTION

CROSS REFERENCE TO RELATED APPLICATIONS

This application claims the benefit of the priority date of European Application No. 13193302.0, filed Nov. 18, 2013, the contents of which are incorporated herein in their entirety.

The invention relates to a gateway coupling a first network comprising a plurality of client application instances to a subsystem comprising servers providing services to the plurality of client application instances. In particular the invention relates to a management function implemented in a gateway that controls access to the service providing subsystem and corresponding features implemented in the servers of the service providing subsystem, wherein a single user may have a plurality of client application instances coupled to the subsystem.

In conventional telecommunication networks, for example in a mobile telecommunications network, a mobile subscriber may use a plurality of devices for connecting to services provided by the mobile telecommunications network. The mobile telecommunications network may provide services to users, wherein said services are provided by software programs running on servers in the core network of the mobile telecommunications network. Each of the user's devices may run an instance of a client application program that is communicatively coupled to a service provided by telecommunications network, i.e. each instance of the client application is coupled to a server in the core network for requesting services.

In conventional telecommunication networks each instance of a user communication application running on a user's device is registered at the service providing server in the core network of the telecommunications network. As a consequence a server located in the telecommunications network that provides the required service to the user allocates resources for each instance of the communication application running on a user's device. In other words each of the application instances running on a user's device requires the service implementing server to allocate corresponding resources, though the communication is dedicated to a single user.

In the context of WebRTC, i.e. Real Time Communications using the internet and as being drafted by the World Wide Web Consortium W3C to enable for example browser-to-browser applications for voice calling and/or video calling or chat or P2P file sharing, it is possible that a customer has multiple instances of a communication application of the same identity logged in to a communications network simultaneously. The user may be logged in via a PC and via a laptop and via TV and via a mobile device at the same time. Each of these terminals may run one or even more instances of the communication application. In a conventional telecommunication network the IP Multimedia Subsystem, i.e. the IMS, manages these multiple instances, which require a registration into the IMS for each instance and rely on IMS forking systems. The IMS accordingly allocates resources for each instance of the communication application. This may have huge ramifications on the processing capacity of the IP Multimedia Subsystem IMS, since a non-negligible amount of processing resources is allocated to the multiple instances of a single user. In case users log in to the WebRTC system the IMS may run out of available processing resources and denies login requests, because a few users are logged-in to the system running a huge amount of communication application instances.

The invention aims at alleviating the problem of handling a plurality of communication application instances associated with a single user in the network.

Figure 2:
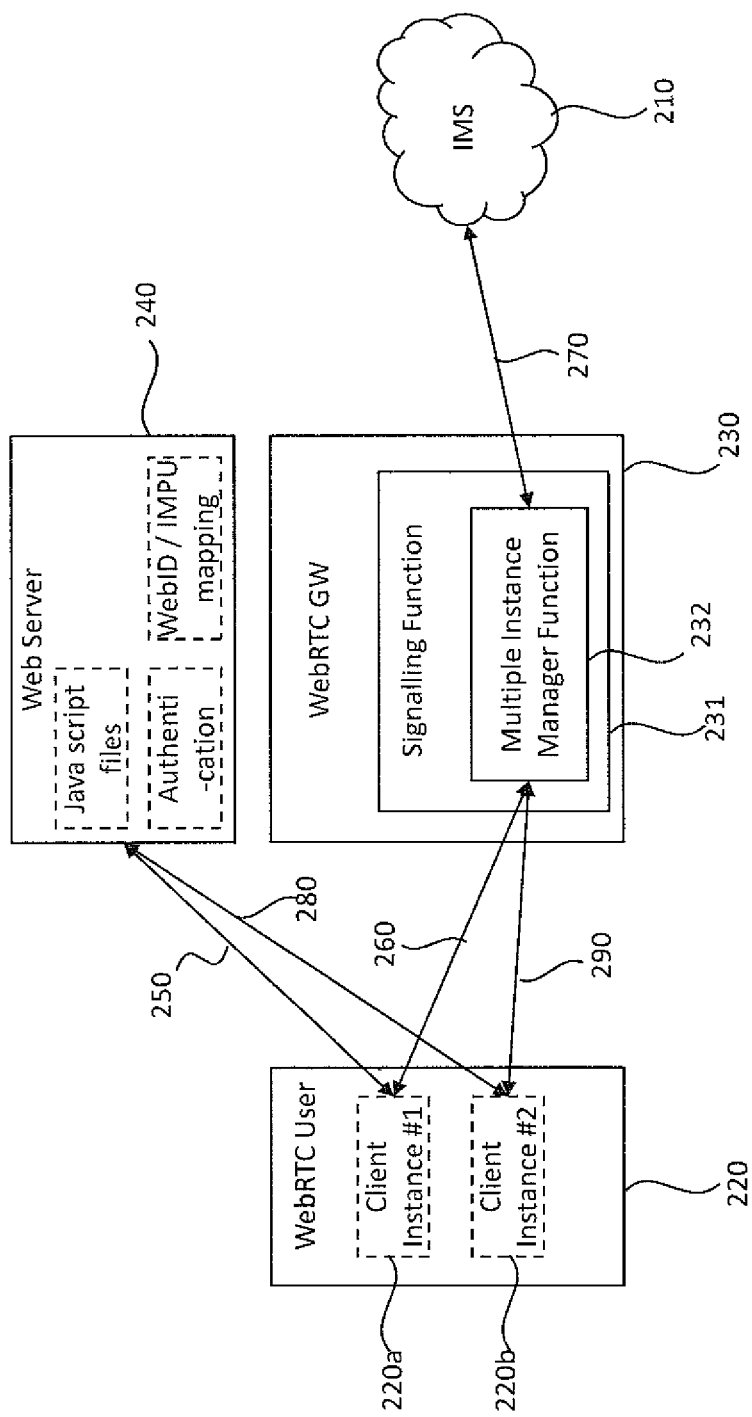
Figure 3:
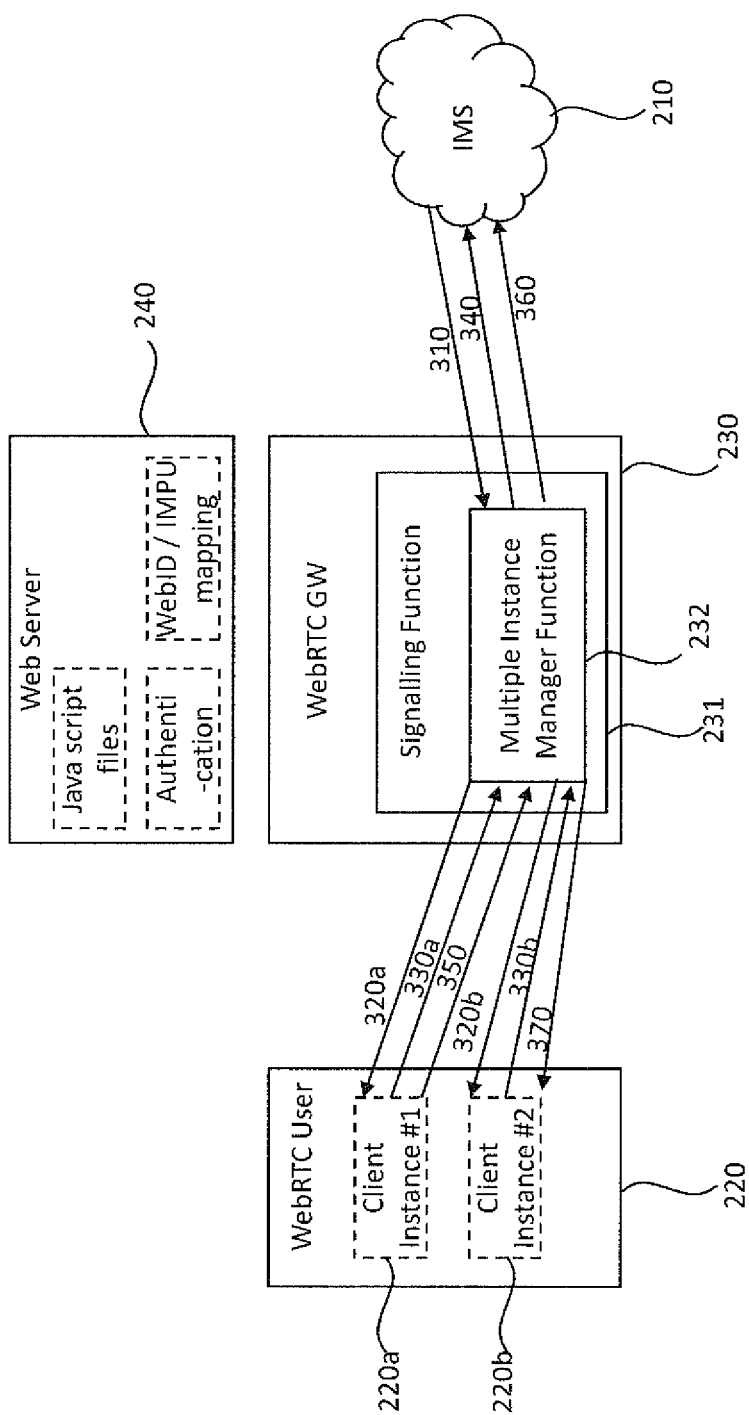

In the following the inventive concept is described with reference to figures wherein
FIG. 1 depicts a schematic telecommunications network;
FIG. 2 depicts a multiple instance registration scenario;
FIG. 3 depicts an incoming communication scenario.

FIG. 1 depicts a schematic of a communication network 100 comprising a subsystem 110, a plurality of terminals 120a, 120b and 120c, and a plurality of gateways 130a, 130b.

Note that in one preferred embodiment and as described in the following the communication application may be a WebRTC application, i.e. an internet browser enabling the user to communicate by voice or video including voice to communicate with other users having the same or a similar WebRTC application in real time. The framework required for real time communications via the internet such as network, audio and video components used in voice and video chat applications is provided by the WebRTC framework.

However, the invention shall not be restricted to this particular embodiment only, but is applicable to comparable network scenarios.

In a preferred embodiment subsystem 110 may be an IP Multimedia Subsystem, IMS, which may deliver multimedia and other services to the devices or terminals 120a, 120b, 120c of a user. More exactly the IMS may provide information to communication applications running on terminals that are logged-in to the IMS. To provide the multimedia services the IMS typically comprises a plurality of application servers for providing the multimedia and in addition thereto a plurality of servers for call control etc. as standardized by 3GPP. In one embodiment the IMS may comprise at least one Call Session Control Function, CSCF, which implements a plurality of SIP functions used to process SIP (Session Initiation Protocol) signaling packets in the IMS, wherein the Session Initiation Protocol, SIP, is a network protocol for establishing, controlling and termination of a communication session. It is specified in RFC 3261.

Gateways 130a, 130b are the gateways that connect the IMS to an access network. A gateway thus acts as a bridge to between the IMS and an access network, wherein the access network is the network enabling the user, i.e. the client instance or user equipment to connect to the gateway. In one embodiment the access network may be a radio access network, RAN, of a mobile telecommunications system or it may be the interne implemented by any arbitrary computer network including web servers, routers, access points, gateways and other functional blocks. Each WebRTC communication is required to access the IMS via a WebRTC gateway, in other words there is no WebRTC instance running on a terminal that connects to the IMS without traversing a WebRTC gateway. A WebRTC client application will always connect to a WebRTC via the interne, wherein the user may use the interne of a mobile device, i.e. using a telecommunications radio access network. In any case the WebRTC client application will connect via the interne to a WebRTC gateway. Note that in one embodiment communication network 100 comprises a plurality of locally spread gateways.

A client instance 120a, 120b, 120c, i.e. an instance of an executed client application, may run on any terminal that is capable of connecting to a service provided by the IMS, e.g. any device capable of running an instance of a WebRTC communication application. In UMTS terminology a terminal 120 is called User Equipment UE which corresponds to a mobile station in GSM terminology. A terminal may be a so-called smart phone or mobile phone or a PC/Laptop or a Personal Digital Assistant PDA or a TV connected to the internet and capable of running a web browser that in turn may run a WebRTC communication application.

Note that the inventive concept shall not be restricted to a particular communication protocol used for exchanging information between a terminal 120 and a gateway 130 as well as for exchanging information between a gateway 130 and IMS 110. However, it is assumed in the following that SIP, i.e. the Session Initiation Protocol as mentioned above, is used at least for the communication between a gateway 130 and subsystem 110, i.e. in one embodiment SIP is assumed as protocol for exchanging information between WebRTC gateway 130 and IP Multimedia Subsystem 110. Furthermore it is assumed that connections 140a, 140b, 140c between a user terminal 120 and a gateway may be managed by the WebRTC framework, which in turn is based on HTML5 and JavaScript, and wherein data transmission may be handled by the so-called Real-Time Transport Protocol RTP or Secure Real-Time Transport Protocol (S)RTP.

In order to alleviate the above mentioned problem of allocating resources for a plurality of application instances associated with one user, the gateway appends an identifier that uniquely identifies the combination of the gateway and the user to uniquely identify all communication of the user with the subsystem that is handled by the gateway. Subsequently said identifier is named user-gateway identifier.

When a client instance associated with a user starts the process of registering with the subsystem, i.e. the IP Multimedia Subsystem of the network, the gateway checks whether this user already has registered with the subsystem. In case the gateway is not aware of any other client instance associated with the user, i.e. it is the first client instance of said user that starts to register with the subsystem, the gateway creates and appends the unique user-gateway identifier to the register request sent to the subsystem. The subsystem registers the user with the unique identifier and will label all communication associated with the user with said identifier. Thus all communication associated with the user and exchanged between this gateway and the subsystem is labeled with said unique identifier.

In case another client instance of the same user contacts the gateway in order to register with the subsystem, the gateway detects that a communication between the gateway and the subsystem has been already established for this user. In this case the gateway will not register the second client instance separately with the subsystem but will append the user-gateway identifier to each subsequent communication. In this way the user is registered only one time with the subsystem. All communication originating from all client instances associated with the user and signaled via the same gateway is identified by the user-gateway identifier.

In one embodiment the user-gateway identifier may comprise a user identifier, i.e. an identifier that uniquely identifies the user in the subsystem, and a gateway identifier, i.e. an identifier that uniquely identifies the gateway within the plurality of relevant gateways, i.e. gateways the user may traverse when connecting to the subsystem. As a consequence the combination of these two identifiers uniquely identifies the combination of a user and a gateway.

In one embodiment and with reference to FIG. 1, when the first client instance 120a of user USER_X approaches WebRTC gateway 130a in order to register with the IMS subsystem 110, the gateway 130a appends a sip.instance parameter with a user-gateway identifier "<GW_id>_<IMPU>", i.e. having a value comprising the unique gateway identifier "<GW_id>" and the unique IP Multimedia Public Identity, IMPU, to the Contact header in each SIP registration. The <IMPU> is the unique IP Multimedia Public Identity which is the same for all WebRTC client instances of that user. The "<GW_id>" value is a unique WebRTC gateway identifier within the network and is associated with gateway 130a, i.e. each gateway uses its associated <GW_id> in all register messages to the IMS. WebRTC gateway 130a forwards in message 150a the SIP registration request including said identifier to IMS 110, which will process SIP message. When a user having an IMPU of "user_x" registers with IMS 110 via gateway 130a associated with identifier GW_a, the gateway appends an identifier "GW_a_user_x" to the Contact header as a sip.instance parameter. IMS 110 will accordingly process the SIP message and will confirm registration of the user to WebRTC gateway 130a, which in turn will confirm registration with the IMS to instance 120a of user user_x.

In case the same user user_x registers another instance of a WebRTC client application, for example a laptop computer 120b, via WebRTC gateway 130b identified by its identifier "GW_b", then gateway 130b will append a user-gateway identifier as sip.instance parameter of the form "sip.instance: GW_b_user_x" to the SIP registration request that uniquely identifies the combination of the user user_x and gateway GW_b.

If the same user user_x registers still another instance of a WebRTC client 120c, for example via another device, but via WebRTC gateway 130b, the gateway 130b will recognize that there is an established communication for said user_x registered with IMS 110. Gateway 130b may then respond to client instance 120c indicating a successful registration with subsystem 110, i.e. the IMS. However, gateway 130b will not forward another SIP registration to IMS 110, but will use the user-gateway identifier "GW_b_user_x" that uniquely identifies user user_x as communication identifier. All communication originating from client instances, i.e. instances 120b and 120c, associated with the same IMPU, i.e. user user_x, and traversing the same gateway, i.e. WebRTC gateway 130b, is identified by the same user-gateway identifier when forwarded to the subsystem, i.e. IMS 110. Similarly all communication received by the subsystem, i.e. IMS 110, and destined for any of the client instances traversing the same gateway, is identified by the same user-gateway identifier, and the gateway will forward these messages to each of the client instances, 120b and 120c, of the user coupled the gateway.

In this way all communication traversing the same gateway and associated with the same user shares one unique identifier, i.e. the user-gateway identifier. In this way a WebRTC gateway hides multiple instances of a user from the IMS and maintains a single IMS registration on behalf of the plurality of instances of the user connected to the gateway, while the IMS may differentiate users based on the registrations of different combinations of users and gateways within the IMS. This significantly reduces the number of instances of user registrations managed by the IMS, thus alleviating the problem of too many user instance registrations in the IMS by forking in the IMS service layer or the IMS Core layer.

The schematic of FIG. 2 illustrates the process of registering two client instances 220a, 220b with subsystem 210, i.e. IMS 210, via a common WebRTC gateway 230, wherein the client instances 220a, 220b are associated with the same IP Multimedia Public Identity IMPU, wherein the IMPU is the unique identifier associated with user_x 220.

In a first communication 250 a first client, i.e. client instance #1 220a, of the plurality of WebRTC clients 220a-220b may optionally access a web server 240. This may be performed for example by inputting the address, i.e. the URL, of the server into a browser application. Upon request of client instance 220a the web server may download web page information and/or JavaScript libraries etc to the WebRTC user device, wherein these data may enable the user's browser to use a WebRTC service. Furthermore the user may authenticate himself by providing some WebID credentials, e.g. a username and a password.

If the user, i.e. client instance #1 220a, successfully authenticates, the web server may grant access to the web and provide a WebRTC gateway address to enable the user to use the WebRTC services.

Note that optionally the web server may check if there is a WebRTC instance registered or known to the web server. In that case the web server 240 may provide the information about the WebRTC gateway used for the already registered WebRTC instance to the user. Otherwise, i.e. if there is no WebRTC instance registered for the user, the web server will provide information, i.e. an address, of a WebRTC gateway that shall be used. Accordingly, if there is a WebRTC instance registered for the user, the web server will direct any WebRTC client instance associated with that user to the same WebRTC gateway thus enabling managing of all client instances associated with that user by the same WebRTC gateway.

Furthermore web server 240 may generate a one-time token that is provided to client instance #1 220a in a response message. Optionally the web server may provide the information regarding the WebRTC gateway together with the one-time token in the response message.

In a second communication 260 client instance #1 220a establishes a connection to WebRTC gateway 230. To establish said connection the WebSocket protocol may be used. Client instance 220a then sends a register message to the Signalling Function 231 that resides in the WebRTC gateway.

The Signaling Function 231 passes the token to the Web Server, which checks the one time token and returns the IMPU to the gateway in case the provided token was valid. In this way the Signaling Function checks the one time token against the WebServer that returns the IMPU, if the one time token is valid. A Multiple Instance Manager Function 232, which in turn may reside in the Signalling Function 231, checks if a WebRTC registration exists for the IMPU associated with the user, i.e. client instance 220a, that requests registration.

In case WebRTC gateway 230 detects that there is no IMS registration associated with the requesting user user_x, it registers said user into the IMS by communication 270, wherein in one embodiment the SIP protocol may be used, and wherein the SIP:REGISTER message includes the user-gateway identifier as described above in the Contact header, i.e. an identifier comprising the IMPU of the user and a gateway ID used by the gateway for all its registrations, and wherein in one embodiment said identifier may be of the format <GW_id>_<IMPU>.

Subsystem 210, i.e. the IMS, will process said SIP: REGISTER message. In one embodiment the IMS may receive the SIP:REGISTER message by a Proxy Call Session Control Function, P-CSCF, that pre-processes the message and in case of successful authorization forwards the message to a Serving Call Session Control Function, S-CSCF, which continues to process the message and registers the user. In particular the IMS will register the User identified by the user-gateway identifier as provided by WebRTC Gateway 230, i.e. in particular by the Multiple Instance Manager Function 232. Note that in alternative embodiments the function of the P-CSCF may be integrated in the WebRTC gateway; i.e. the gateway directly interfaces the Serving CSCF and will accordingly provide the register message directly to the S-CSCF. In any case the subsystem 210, i.e. the IMS, will provide a response message to Multiple Instance Manager Function 232 indicating the successful registration of the requesting user. As a consequence, subsystem 210 will associate each communication associated with that IMPU with this registration.

Multiple Instance Manager Function then sends a message to the requesting client instance #1 220a in response to the register message in communication 260 indicating that client instance #1 220a was successfully registered in the IMS subsystem 210.

The same user as associated with client instance #1 220a may start another WebRTC client instance 220b. The first client instance #1 associated with the user and said another client instance #2 220b may be executed on the same hardware device. Alternatively the first and said another instance may be executed on two distinct devices. The processing of these two and any additional WebRTC client instance is handled by the system in the same way, i.e. regardless of the hardware device executing the client instance, i.e. the underlying hardware is of no relevance for the processing of the associated communication in the network.

In order to enable WebRTC communication said another client instance associated with the same user, i.e. client instance #2 220b, may send a message to web server 240 in communication 280. Basically that message may be processed similar as the corresponding communication originating from client instance #1 220a, i.e. the instance may authenticate etc.

In one embodiment web server 240 may optionally check if there is a WebRTC client instance already registered for the same user. In this case, i.e. since there is at least one client instance being active as WebRTC client at the time of processing the request of client instance #2, the web server will provide the address of the WebRTC gateway that was communicated to the at least one active other client instance. In other words web server 240 provides the address of the WebRTC gateway 230 that was communicated to the previous client instance.

Client instance #2 220b may then send a register message to WebRTC gateway 230 in communication 290. Similar to the processing of the request message originating from the client instance #1 220a, this register message originating from client instance #2 is processed by Multiple Instance Manager Function 232. Accordingly, Multiple Instance Manager Function 232 checks if a WebRTC registration exists for the IMPU associated with the user, i.e. client instance 220b, that requests registration. As client instance 220a is validly registered in the IMS at the time of processing the register request originating from client instance #2 220b, the Multiple Instance Manager Function does not establish another IMS registration, but sends a response message to client instance #2 indicating that the instance has been successfully registered in the IMS subsystem 210. Client instance #2 may then start to use a WebRTC service provided by the IMS.

The gateway 230 associates all communication of the user's client instances 220a and 220b with the single user-gateway identifier registered for this combination of user and gateway. Subsystem 210, i.e. the IMS, accordingly has to manage only one registration for that user, more exactly for the unique combination of the user and the gateway. In this way gateway 230 aggregates the communication of all client instances associated with one user by associating the communication originating from and destined for said user with one registration. The number of registrations in the IMS in this way is significantly reduced, thus reducing the resources required for providing the WebRTC services.

Note that in case web server 240 checks for each client instance whether there is another active instance for that user and provides corresponding information related to the WebRTC gateway that shall be used by the additional client instance, then any new additional client instance of the same user will register via one gateway. Consequently all communication associated with a user traverses only one gateway, which will register said user only one time. Thus all communication of the user is associated with only one registration in the subsystem, i.e. in IMS 210.

The call flow 300 as depicted in FIG. 3 illustrates the handling of two exemplifying client instances, client application instance 220a and client application instance 220b, associated with one user, wherein the gateway function receives ingress signaling for communications 310 towards a WebRTC user 220. Said ingress signaling can be an invitation of another user registered in the IMS, not shown in the figure, who intends to communicate with the user running client application instances 220a and 220b. Note that in this scenario it is assumed that both client instances 220a and 220b have registered with the IMS subsystem 210 as described above via gateway 230 previously.

When Multiple Instance Manager Function 232 of WebRTC gateway 230 manages a plurality of client instances associated with one user, here instances 220a and 220b, the function forks communication attempts to all client instances of the user connected to the gateway 230, e.g. gateway 230 sends a communication request message 320a to client instance 220a and the same message 320b to client instance 220b to indicate a communication attempt.

Both client instances 220a and 220b will reply to the respective request message by sending a response "Ringing" message 330a and 330b respectively to the gateway.

As soon as gateway 230 receives a Ringing message 330a or 330b from at least one of the client instances, it sends one single SIP 180 message 340, i.e. a provisional response message, to the IMS indicating that the connection request has been passed to a client instance of the requested user. Note that gateway 230 hides the plurality of client instances 220a, 220b associated with user 220 from IMS 210, i.e. from an IMS perspective it is communicating with a single registration and sees the gateway as a single WebRTC user identified by above mentioned identifier. Effectively, the Multiple Instance Manager Function in the gateway lets the IMS subsystem 'see' and treat the WebRTC user as a single user irrespective of how many instances the user may have running.

Note that gateway 230 sends only one SIP 180 message 340 to the IMS 210 and suppresses another SIP 180 message even if another WebRTC response message is received from another client instance associated with the user. In the event one of the client instances returns an error, e.g. during call establishment, this will have no effect on the other instances attempts, i.e. all other instances shall remain attempted.

In the event a user actively rejects an incoming communication request, i.e. the user hits the 'decline' button in one of the client application instances, said respective client instance sends a corresponding decline message to gateway 230. Upon receipt of said decline message from one of the plurality of client instances, the gateway will send a corresponding decline message to the IMS and sends a cancel message to the other client instances to notify these that the communication request has been declined and is no longer active.

When one of the client instances 220a or 220b, i.e. client instance 220a accepts the communication request, the respective client instance 220a sends corresponding response message 350 to gateway 230, i.e. to the multiple instance manager function 232.

The gateway immediately sends a corresponding accept message 360 to the IMS thus indicating that the communication has been accepted by the user. Note that the gateway does not communicate to the IMS subsystem which of the plurality of client instances has accepted the communication.

In parallel the gateway sends a cancel message 370 to client instance 220b to indicate that the call requested is no longer valid, thus releasing client instance 220b from an alerting state. Note that in one embodiment the gateway may send information to instance 220b to suppress any "missed call" notification, since the call in fact has been answered by the user via client instance 220a. In this way a connection is agreed between client instance 220a and IMS 210. All subsequent communication belonging to the sequence of this initial ingress communication 310 takes place between client instance 220a and the IMS, i.e. the Multiple Instance Manager Function logically separates and binds any communications from client instances to the IMS communications.

Note that the SIP messages establish a communication path only, wherein the SIP protocol does not control the exchange of the communication data itself in case of a voice and/or video communication. The exchange of communication data, i.e. payload data, between client instance 220a and the IMS subnet may be based on the Real Time Protocol RTP as described in RFC3550 or may be based on the corresponding encrypted protocol SRTP as described in RFC3711. However, SIP defines some message conveying communication data as payload.

Gateway 230 releases the registration of the user in subnet 210 upon disconnection of the last client instance of a user. In case one of the client instances 220a or 220b of user 220 disconnects from gateway 230, either due to a broken connection line, i.e. loss of IP connectivity, or intentionally, e.g. gateway 230 receives a de-register message from a client instance, the gateway checks if there is still at least one client instance of that user connected to the gateway. Gateway 230 de-registers the IMPU from the IMS only if there is no client application instance of that user connected to the gateway. In other words as long as there is at least one client application instance of that user connected to the gateway, the IMS registration persists.

In this way gateway 230 shields and hides the plurality of WebRTC client instances from the IMS core network. This is achieved by maintaining a single IMS registration on behalf of all WebRTC client instances, thus pretending that there is only one WebRTC instance. All IMS registration actions or de-registration actions or re-registrations include a unique identifier in the Contact header of the Register message, which may comprise the IMPU of the WebRTC user and the gateway that the client instances associated with the user are connected to.

The invention claimed is:

1. A method for managing a plurality of client application instances in a network, each client application instance being associated with a user, wherein the client application instances are capable to connect to a service function provided by a subsystem of the network via at least one gateway, the method comprising:
registering the user of a first client application instance in the subsystem by a gateway using a single user-gateway identifier that uniquely identifies the combination of the user and the gateway; and,
aggregating, by the gateway, communications originating from or destined to the user by labeling a first communication of the first client application instance and a second communication of a second client application instance with the registered single user-gateway identifier.

2. The method of claim 1, wherein the gateway is a WebRTC gateway bridging an IP Multimedia subsystem, IMS, and an access network.

3. The method of claim 1, wherein at least one of the first client application instance and the second client application instance is a computer program executed on a user terminal that connects to the gateway via an access network, and wherein said at least one of the first client application instance and the second client application instance is capable to connect to a service function provided by the subsystem.

4. The method of claim 1, wherein all communications originating from or destined to client application instances of the user traverses a single gateway, and wherein the all communications in the subsystem associated with said user are identified by the user-gateway identifier.

5. The method of claim 1, wherein the gateway de-registers the user when there is no client application instance of said user connected to the gateway.

6. The method of claim 1, wherein the user-gateway identifier comprises a user identifier and a unique gateway identifier.

7. The method of claim 6, wherein the user identifier is an IP Multimedia Public Identity, IMPU.

8. A gateway computer bridging an access network and a subsystem, wherein
the gateway computer is adapted and configured to be connected to a plurality of client application instances associated with a user via the access network, and
the gateway computer is adapted and configured to register the user of a first client application instance in the subsystem by the gateway computer using a single user-gateway identifier comprising that uniquely identifies the combination of the user and the gateway computer; and
the gateway computer is adapted and configured to provide the user gateway identifier to the subsystem and to aggregate communications originating from or destined to the user by labeling a first communication of the first instance of the client application and a second communication of a second instance of the client application instance with the registered single user-gateway identifier.

9. The gateway computer of claim 8, wherein the subsystem is an IP Multimedia Subsystem, IMS.

10. The gateway computer of claim 9, wherein the gateway computer is a WebRTC gateway bridging the IP Multimedia subsystem and an access network.

11. The gateway computer of claim 8, wherein the gateway computer is adapted and configured to facilitate at least one of the first client application instance and the second client application instance to connect to a service function provided by the subsystem, and wherein the at least one of the first client application instance and the second client application instance comprises a computer program executed on a user terminal via an access network.

12. The gateway computer of claim 8, wherein only the gateway computer is configured to receive all communications originating from or destined to client application instances of the user and wherein the all communications in the subsystem associated with said user are identified by the user-gateway identifier.

13. The gateway computer of claim 8, wherein the gateway computer de-registers the user when there is no client application instance of said user connected to the gateway computer.

14. The gateway computer of claim 8, wherein the user-gateway identifier comprises a user identifier and a unique gateway identifier.

15. The gateway computer of claim 14, wherein the user identifier is an IP Multimedia Public Identity, IMPU.

16. The method of claim 1, further comprising:
receiving an invitation signal from an IP Multimedia subsystem;
sending communication request messages to at the first client application instance and the second client application instance in response to the invitation signal; and
upon receipt of a response message from one of the first client application instance and the second client application instance responsive to one of the communication request messages, cancelling another of the communication request messages sent to another of the first client application instance and the second client application instance.

* * * * *